(12) United States Patent
Mandile

(10) Patent No.: US 6,592,035 B2
(45) Date of Patent: Jul. 15, 2003

(54) METHOD AND APPARATUS FOR RAPID, SERIAL TRANSACTION ITEM FABRICATION

(75) Inventor: Joseph T. Mandile, Middleboro, MA (US)

(73) Assignee: Arthur Blank & Co., Boston, MA (US)

(*) Notice: Subject to any disclaimer, the term of this patent is extended or adjusted under 35 U.S.C. 154(b) by 0 days.

(21) Appl. No.: 09/965,440

(22) Filed: Sep. 27, 2001

(65) Prior Publication Data

US 2003/0057280 A1 Mar. 27, 2003

(51) Int. Cl.[7] .................................................. G06K 7/10
(52) U.S. Cl. ........................ 235/454; 235/493; 235/492; 235/487
(58) Field of Search ................................ 235/454, 493, 235/487, 492

(56) References Cited

U.S. PATENT DOCUMENTS

| | | | |
|---|---|---|---|
| 5,980,011 A | | 11/1999 | Cummins et al. |
| 6,173,901 B1 | * | 1/2001 | McCannel ................. 235/493 |
| 6,347,740 B1 | * | 2/2002 | Bengala ..................... 235/454 |
| 6,418,422 B1 | * | 7/2002 | Guenther et al. .......... 705/401 |

* cited by examiner

Primary Examiner—Karl D. Frech
Assistant Examiner—Allyson Sanders
(74) Attorney, Agent, or Firm—Wolf, Greenfield & Sacks, P.C.

(57) ABSTRACT

A system and method for processing transaction items in a serial fashion allows sequences of transaction items to be produced in a specified and complete order. In one aspect, transaction items are produced one-at-a-time and creation of a next transaction item is not begun until a current transaction item is completed. High item throughput rates can also be provided along with multi-stage, multi-speed processing schemes.

63 Claims, 3 Drawing Sheets

METHOD AND APPARATUS FOR RAPID, SERIAL TRANSACTION ITEM FABRICATION

FIELD OF THE INVENTION

The invention relates to transaction item fabrication.

DESCRIPTION OF RELATED ART

High-speed transaction card manufacturing systems that currently exist, process transaction cards at speeds up to 30,000 cards per hour and up. These transaction cards typically include cards that are used in a variety of different transactions, such as credit card purchases, loyalty programs (e.g., frequent flyer accounts, supermarket loyalty accounts, etc.), telephone calling cards, electronic cash cards, and so on. Many of these cards include one or more areas that have an identifier or other information used to identify the card and/or to associate a transaction made using the card with an issuee (e.g., a person that was issued the card). For example, the cards may have an encodable magnetic strip, electronic circuit or other memory device that is encoded with an identifier, such as an alphanumeric sequence, that uniquely identifies the cards. The identifier on each card may be associated with an issuee of the card so that the issuee can be credited with something of value (such as frequent flyer miles) or charged (as in the case of a purchase) for transactions made with the card. The card may also include the identifier or other information in an image formed on the card, such as by inkjet or thermal printing, or other means. The image may be a bar code, a name, an alphanumeric sequence, or other information.

High-speed card processing systems typically process multiple cards moving along a conveyor in parallel to achieve the high card production rates demanded in some applications. That is, such high-speed systems have several different stations along a conveyor line that simultaneously encode, print and/or verify information encoded/printed on multiple cards along the conveyor line. For example, such systems typically encode a first card at a first station while verifying the encoding processing on a second card at a second station, printing a third card at a third station and verifying the printing on a fourth card at a fourth station as the cards move past the stations on a conveyor belt.

SUMMARY OF THE INVENTION

The inventors have appreciated several drawbacks to such processing in some cases, particularly when producing a set of many distinct transaction items in a specific sequence. For example, a customer may require that a set of transaction cards be provided in a numbered sequence from Card No. 1 through Card No. 10,000 in ascending order, i.e., so Card No. 1 is followed by Card No. 2, Card No. 2 is followed by Card No. 3, and so on. The parallel processing system described above may begin processing the set of cards by first encoding a magnetic strip on Card No. 1, and then at the next station verifying the encoding of Card No. 1 as the card moves down the processing line. While encoding is being verified in Card No. 1, Card No. 2 is being encoded. Next, the cards move down the processing line so Card No. 1 is printed with information such as a bar code, encoding of Card No. 2 is verified, and Card No. 3 is encoded. After this processing, the cards again move down the processing line and Card No. 1 has its printing verified, Card No. 2 is printed, Card No. 3 has its encoding verified, and Card No. 4 is encoded. Thus, one card in a sequence may have its printing verified while a second card is being printed, a third card is having the encoding verified and a fourth card is being encoded. In this way, assuming that all cards are properly processed, the cards can be made in order from Card No. 1 to Card No. 10,000 and be provided in the proper order.

However, processing of large batches of cards cannot typically be done without at least one card being improperly processed, e.g., encoding or printing not being properly performed on the card. In the example above, if the printing on the first card (e.g., Card No. 1) is determined to be improper, the first card can be remade, but since the second, third and fourth cards (Cards No. 2 through 4) are already in process and moving along the processing line, the first card must either be remade out of order after the fourth card, or all of the cards in process after Card No. 1 must be discarded to preserve the ordered sequence of cards. That is, Card No. 1 will have to be remade after Card No. 4, e.g., between Card Nos. 15 and 16, or Cards Nos. 1–4 must be discarded and the system made to begin processing again at Card No. 1. Discarding the several cards following an improperly processed card and starting over may make ordering of the cards in the proper sequence easier, for otherwise the remake of the improper card must be specially picked and placed in the card sequence when card processing is complete. However, discarding several otherwise properly processed cards can be wasteful and time consuming.

Although not all aspects of the invention are so limited, in at least one aspect of the invention, transaction items, such as transaction card assemblies, may be processed in a serial fashion so that one or more operations are performed on the items, e.g., an item is encoded, printed and/or verified, before a next item in a sequence begins processing. As a result, if the item is improperly processed at any step in the process, the item can be remade before a next item even begins processing, and transaction items produced in a desired, ordered sequence. In one aspect of the invention, transaction items may be serially processed at a rate of 200 items per hour and up. Item processing rates may vary depending on the operations being performed, e.g., laser marking of a transaction item may need to be performed at a slower rate than ink jet printing, thus slowing the transaction item production rate.

In one illustrative embodiment, a system for processing transaction items is adapted to create a set of transaction items where each transaction item in the set is uniquely identified from other transaction items in the set. The system includes a transport that moves transaction items along a path, and at least one item altering device that performs an operation on a first transaction item. At least one of the operations performed by the item altering device(s), when properly performed, causes the first transaction item to be uniquely identified from other transaction items in a set of transaction items properly processed by the item altering device(s). A verification system detects information indicative of whether the transaction item has been properly processed by the item altering device(s), and a controller automatically controls the item altering device(s) to remake the first transaction item if the first transaction item has been improperly processed before controlling the item altering device(s) to make a next transaction item.

In another aspect, a method for processing a set of processed transaction items includes moving a first transaction item along a path, performing a first operation on the first transaction item that alters the first transaction item, and performing a second operation on the first transaction item that alters the first transaction item. The first and second operations, when properly performed, cause the first transaction item to be uniquely identified from other transaction items in a set of processed transaction items. Information indicative of whether the first and second operations were properly performed on the first transaction item is detected, and the first transaction item is automatically remade if one of the first and second operations were improperly performed on the first transaction item before making a next transaction item so that the set of processed transaction items is created in a specific transaction item sequence.

In another aspect of the invention, transaction items may travel at average speeds of at least 10 feet per minute and up to 1,100 feet per minute during at least some portions of processing. Average transaction item speeds may vary depending on the type of processing being performed.

In another aspect of the invention, transaction items may travel at different speeds for different stages in processing. For example, encoding may be performed at a first travel speed, while other processing, such as printing, may be performed at a different travel speed. Such a multi-stage travel arrangement can provide for reduced processing times since each stage in transaction item processing may be performed at a maximum possible speed.

These and other aspects of the invention will become apparent from the following detailed description and the appended claims.

BRIEF DESCRIPTION OF THE DRAWINGS

Illustrative embodiments in accordance with various aspects of the invention are described below in connection with the following drawings in which like numerals reference like elements, and wherein.

DETAILED DESCRIPTION

Figures 1, 2:
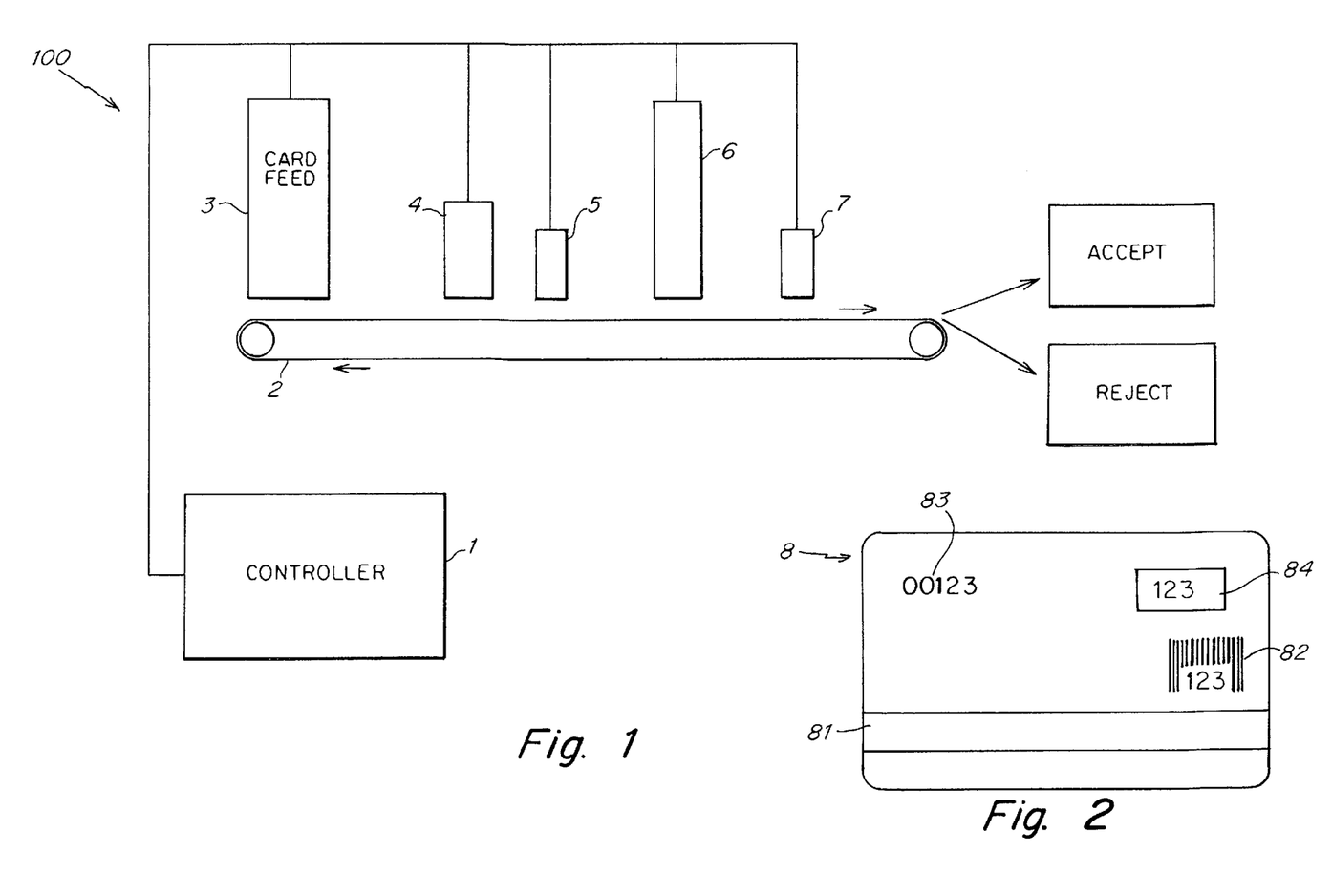
FIG. 1 is a schematic diagram of a transaction item processing system in accordance with an aspect of the invention.
FIG. 2 shows an illustrative transaction item in accordance with an aspect of the invention.

FIG. 1 is a schematic diagram of a transaction item processing system 100 that incorporates various aspects of the invention. In this illustrative embodiment, the processing system 100 processes transaction items in serial fashion so that a transaction item enters and completes processing before a next transaction item begins processing. Thus, actual processing of another transaction item is not begun by the system until processing of a previous item is completed. In this way, the system 100 can make a set of transaction items in a particular order even if errors occur in making one or more transaction items. In the illustrative embodiments below, transaction items are moved along a path past item altering devices, such as an encoder or a printer, that perform operations on the transaction items, and verification sensors that sense information representing whether the operations, e.g., encoding and printing, have been performed properly on an item. Although encoding and printing are performed in these illustrative embodiments, it should be understood that any suitable processing of items may be performed in accordance with various aspects of the invention. Moreover, although in the illustrative embodiments described below multiple operations are performed on each transaction item, a single operation on a transaction item, such as encoding only or printing only, may be performed. Thus, in one embodiment, a transaction item processing system 100 may include a single item altering device, such as one encoder or one printer, so that the system 100 performs only one operation on a transaction item to change the transaction item in some way.

As used herein, the term transaction item refers to any suitable arrangement to be processed, such as a single transaction card or other substrate, an oversized card or sign, a plurality of interconnected cards, assemblies including one or more card portions attached to one or more keytag or other portions, and so on. For example, a transaction item may be made from a single sheet of plastic material or other substrate that is perforated in various places to define one or more cards, one or more keytag portions, a waste portion, etc. The perforated portions may be separated from each other by bending or tearing at the perforation. Of course, transaction items need not have any perforations or otherwise have separable portions, and may be made of any suitable material(s) other than sheet plastic, such as paper, metal, composites, etc. Transaction items may include any other suitable features, such as electronic or optical memory devices, holograms, data processors, visual displays, and so on.

As used herein, processing of a transaction item is begun once an actual operation on the transaction item is performed, such as actual encoding of the transaction item, printing, or other processes performed on the item. Preparatory activity, such as loading buffer memories, sending electronic instructions, transporting transaction items or other activities in preparation for performing a process on an item by the system does not start processing of an item. In at least one embodiment, processing is performed by an integrated system in which the processing is performed automatically without requiring human handling of the transaction item between processes. This is not to rule out, however, any processing that may be performed on the transaction items before or after processing by the integrated system, as it should be understood that any other suitable processing may be performed before or after processing by the integrated system, such as die cutting assemblies from stock material, lamination processes, etc.

Also, as used herein, processing of a transaction item is completed once a determination is made that the item has been improperly made at any stage in processing, or when a determination is made that the item has been properly made. For example, if after an item is encoded, the verification process determines that encoding has not been properly performed, processing of that item can be determined to be completed whether or not subsequent processes, such as printing, have been or will be performed. On the other hand, if encoding, printing and/or other processing has been completed and determined to be performed properly, processing of the item can be determined completed.

In the illustrative embodiment of FIG. 1, transaction items are fed onto a transport 2 by a feeder 3 under the control of a controller 1, which also controls the operations of the other components in the system 100. In this example, the transport 2 includes a conveyor belt that rotates in a clockwise direction as shown by the arrows in FIG. 1. However, it should be understood that the transport 2 may be any suitable device capable of moving transaction items along a processing path, whether the path is linear or has any other suitable configuration. For example, a conveyor belt may have registration pins or other devices so that transaction items are positioned in indexed locations on the belt, a conveyor belt may have a vacuum system that draws air through holes in the belt to generate a suction force that keeps transaction items in place on the belt, transaction items may be moved by a shuttle that slides along rails, robotic handling devices may be used to move transaction items, and so on. In some embodiments, it may be desirable to arrange the transport 2 to move items as quickly as possible between and/or at each stage in processing so that total processing times for each item can be minimized. In addition, the speed at which the transport 2 moves items may be controlled to cooperate with the various processing operations performed. For example, encoding may be performed on the items within a particular maximum speed range (not faster or slower), and the transport 2 may be arranged to move the transaction items at the desired speed during encoding.

Like the transport 2, the feeder 3 may have any suitable arrangement for supplying transaction items to the transport 2. For example, the feeder 3 may be arranged to receive stacks of unprocessed transaction items and feed the transaction items one at a time to the transport 2. Such feeding devices and transports are well known in the art and not described in detail here.

Items provided to the transport 2 are moved to a first item altering device 4 that performs one or more operations on the transaction items, i.e., to change the transaction item in some way whether visually or otherwise. For example, the first item altering device 4 may include at least one encoder that encodes a memory on the transaction items. An encoder may be any suitable type of device, typically depending upon the type of memory in the transaction items that is being encoded. For example, if magnetic strips in the transaction items are encoded by the encoder, the encoder will typically be a magnetic strip encoder as is widely known and used in the art. If the encoded memory in the transaction items is a volatile or non-volatile semiconductor device, the encoder may take other forms suitable for encoding such memories as will be understood. Similarly, other types of encoders are typically required to encode other types of memories, such as optical, holographic, and other storage devices. The encoder may encode any type of information, such as an alphanumeric code that uniquely identifies the transaction item from other transaction items in a set. Other information, such as bioinformatic information (e.g., fingerprint, retina scan, DNA or other similar information), executable computer code (e.g., for execution by a processor in the item or other system), address information, a dollar amount (e.g., for prepaid telephone cards or cash cards), and other information may be encoded in the memory of the transaction items. Of course, it should be understood that the first item altering device 4 may include any suitable device or set of devices, such as multiple encoders, one or more marking devices (such as inkjet printers, thermal printers, laser marking devices, etc.), or any other device that performs an operation that changes the transaction item in some way. Moreover, the operation performed may, either alone or in combination with other operations performed by other devices, uniquely identify the transaction item from other items in a set. For example, a unique identifier may be encoded in a magnetic strip of a transaction item that is different from all other identifiers encoded in the magnetic strips of other transaction items in a set.

Operations performed on a transaction item by the first item altering device 4 may be verified by a first verification sensor 5, i.e., information may be detected that is representative of whether the operation performed on the item was performed properly. For example, if the first item altering device 4 includes an encoder, information encoded in the transaction items may be verified by an encoding sensor in the verification sensor 5. That is, the encoding sensor may read the information encoded in the transaction item or otherwise determine that the information has been properly encoded in the transaction item as the item is moved by the transport 2. For example, if an alphanumeric character string or other identifier is encoded in the memory of a transaction item, the verification sensor 5 may read the memory to determine that alphanumeric code has been properly encoded in the memory. If the alphanumeric string read by the verification sensor 5 matches the string intended to be written by the altering device 4, a determination may be made, e.g., by the controller 1, that the transaction item has been properly encoded. The verification sensor 5 may take any suitable form, e.g., depending upon the nature of the operation performed on the item, such as the type of memory and the information to be read or otherwise received from the memory. In addition, the verification sensor 5 may be the same device as the altering device 4. For example, an encoder in the altering device 4 may change operation modes to act as a verification sensor 5 and read information from the transaction item rather than encode it. In one embodiment where the altering device 4 also performs verification, the transport 2 may reverse direction or otherwise route the transaction item after encoding back to the altering device 4 for verification processing.

Although not required for all aspects of the invention, in this embodiment, the system 100 includes a second item altering device 6 that performs one or more operations on the transaction item to change the item in some way. In this embodiment, the second item altering device 6 includes one or more marking devices that form image information on the transaction items, but it should be understood that the second item altering device 6 may include any suitable device(s), such as one or more encoders, embossing devices, laminators, die cutting or punching devices, and so on. The marking devices may be an inkjet, thermal, laser or other printer or any other suitable device capable of forming an image on the transaction items. The image may take any suitable form, such as a bar code, name, visible or invisible alphanumeric string, a photograph, a geometric or graphic pattern, and so on. The image may include any suitable colors, holographic images, or other image components. In some cases, the image formed on the transaction items may be related in some way to the information encoded in the memory in a transaction item or otherwise provided on the item. For example, a bar code or other image printed on the transaction item may represent an alphanumeric sequence that matches an alphanumeric sequence encoded in the memory of the transaction item.

A verification sensor 7 determines whether operations performed by the second item altering device 6, e.g., printing that creates image information, on a transaction item have been properly performed. As with the other components of this processing system 100, the verification sensor 7 may include any suitable device capable of verifying the performance of operations, e.g., the veracity or accuracy of image information formed on a transaction item. For example, the verification sensor 7 may include a bar code reader, video camera, or any other device suitable for detecting image information. Together, the verification sensor 5 and the verification sensor 7 are part of a verification system that detects information indicative of whether the transaction item has been properly processed.

Verification may take place in any sequence or timing. For example, verification may take place after processing steps performed on the item, such as immediately after encoding and printing as shown in the FIG. 1 system, or after two or more such steps are complete. Verification processing that determines a transaction item has not been properly formed may result in completion of processing for the item. For example, if a transaction item in the FIG. 1 system is determined to have been improperly encoded by the verification sensor 5, the item may be rejected, and printing or other processing not performed on the item (even though the transport 2 carries the item past the second item altering device 6 and the verification sensor 7 to a reject box).

Based on the outcome of the verification process, transaction items may either be accepted as properly processed, or rejected. If a transaction item is rejected because a process has been improperly performed, a new transaction item may be provided by the feeder 3 to the transport 2 either before or after the rejected item is removed from the transport 2 so that the new transaction item may be processed to remake the improperly formed transaction item. For example, an improperly processed transaction item may be discarded and another blank, previously unprocessed transaction item may be encoded with the same information and provided with the same image information as that intended to be formed on the discarded transaction item. If an improperly processed transaction item is to be discarded, the controller 1 may confirm that the transaction item has been successfully removed from the transport 2, e.g., to the reject box, before feeding another blank transaction item for processing. In this way, the system can ensure that improperly processed items are removed from the finished set of transaction items. Alternately, depending on the nature of the improper processing, an improperly processed item may be remade by re-processing the transaction item to correct the error. For example, if a memory is improperly encoded, the transport 2 may reverse direction so the transaction item can be encoded again. As a result, sets of transaction items may be made in an ordered sequence so that the transaction items may be provided as a complete, ordered set.

For example, 10,000 transaction items may be made each with a unique identifier encoded into the memory and printed as an image (e.g., a bar code) on the transaction items. As one example, the transaction items may be encoded and printed with identifiers from 00001 to 10000 in numerical order. Since the transaction items are made in a serial fashion, if at some point during processing (such as while processing transaction item no. 05000) a transaction item is improperly processed, the improperly processed transaction item may be discarded and a replacement made in its place. That is, another unaltered transaction item may be provided by the feeder 3 so the first and second item altering devices 4 and 6 can again attempt to encode and print information (the 05000 identifier) on the transaction item. Since no intervening transaction items had begun processing before the improperly made item was identified, the transaction item order may be preserved.

Although in this illustrative embodiment, encoding and printing operations as well as verification are performed on the transaction items, the first and second item altering devices 4 and 6 may perform one or more of the same or other processes. Moreover, the processes performed may be arranged in any suitable order. Thus, printing may be performed before encoding, and so on. Processes may be performed by multiple devices, e.g., an image formed on a transaction item may be formed by two or more printers or other image forming devices rather than by one printer alone, or two encoders may be included in the system and used in an alternating or redundant manner so that a first assembly is encoded by a first encoder, a second assembly is encoded by the second encoder, a third assembly is encoded by the first encoder, etc. As discussed above, aspects of the invention are not limited to encoding and printing of transaction items, and these basic principles may be applied to any suitable processing of transaction items.

In this illustrative embodiment, operations of the various components of the processing system 100 are controlled by the controller 1. The controller 1 may be a general purpose data processing system, such as a suitably programmed general purpose computer, or network of general purpose computers and other associated devices, including communication devices and/or other circuitry or components necessary to perform the desired input/output or other functions. The controller 1 can also be implemented, at least in part, as a single special purpose integrated circuit (e.g., an Application-Specific Integrated Circuit-ASIC), or an array of ASICs each having a main or central processor section for overall, system level control and separate sections dedicated to performing various different specific computations, functions and other processes under the control of the central processor section. The controller 1 can also be implemented using a plurality of separate, dedicated programmable integrated or other electronic circuits or devices, e.g., hardwired electronic or logic circuits, such as discrete element circuits or programmable logic devices. The controller 1 may also include any other suitable devices, such as one or more information display devices (e.g., a computer monitor), user input devices, such as keyboards, user pointing devices, touch screens or other user interfaces, data storage devices, such as volatile or non-volatile memory, communication devices or other electronic circuitry or components. Although the controller 1 is shown as a single centralized unit, the controller 1 may be implemented by 2 or more discrete control systems, if desired. Other devices in the controller 1 may be used to determine transaction item position on the item transport 2, such as by optical sensors or other devices, or devices to ensure that the encoding, printing, verification and other processeees or properly timed with respect to moving transaction items. Communication between the various components in the processing system 1 may be performed using any suitable communications system, whether wired or wireless, using any communications protocol, data format or other scheme to transmit information.

The first and second item altering devices 4 and 6 or other processing devices may include storage devices, such as buffer memories, to store one or more sets of information for processing one or more transaction items. For example, the controller 1 may store information needed to perform operations on the transaction items, e.g., information used to control an encoder and printer to encode and print a particular alphanumeric string on an item, in a table format such that each row in the table corresponds to a particular transaction item. The controller may supply this information to the first and second item altering devices 4 and 6 in any suitable way so that the devices 4 and 6 properly process items. For example, an encoder may have a memory that stores five different sets of information supplied by the controller 1, with each set of information used to encode a separate transaction item. Storage of multiple information sets by the encoder need not affect serial processing of transaction items in any adverse way. In the example above, the five sets of information may be stored in memory slots 1–5 of the encoder, with slot 1 being the active slot used by the encoder to encode transaction items. Information in this slot will remain active and used to encode items until the controller 1 causes the information in slots 2–5 to be latched up one slot into slots 1–4, respectively. At that time, information that was in slot 2 will be in slot 1 and used to encode items. The latching operation may be performed by the controller and memory once an item has been determined to have been properly processed. Thus, the information set used to process the transaction item will remain active until the transaction item is complete so that if a transaction item needs to be remade, the information in the active slot can be used again to process the item. Alternately, the devices may not include any memory and use information fed in "real time" from the controller 1 or other device to process the transaction item, or may receive the information needed to perform operations in any other suitable way.

FIG. 2 shows a transaction item that may be processed in accordance with aspects of the invention. In this illustrative embodiment, the transaction item 8 has a memory 81 that stores encoded information. In this embodiment, the memory 81 is a magnetic strip that may be encoded using any suitable process or apparatus. Of course, the memory 81 may include any other devices, such as semiconductor devices, optical memory, or other storage devices capable of storing any suitable information. In this embodiment, the memory 81 is encoded with at least an identifier "123". The transaction item 8 also includes image information, in this case, in the form of bar code 82, an alphanumeric sequence 83, and a label 84 also carrying the alphanumeric sequence. This image information may be formed in any suitable way, such as by an inkjet printer, thermal printer, laser writing device, embossing process, etc. In this case, the identifier encoded in the memory 81 corresponds to the image information printed on the transaction item 8 (i.e., "00123"), but such correspondence is not necessary. In addition, although the transaction item 8 in this example has a typical rectangular, credit card shape, the transaction item 8 may have any suitable shape and be made of any suitable material, such as plastic, paper, laminated material, and so on. The transaction item may have one or more perforated portions or other sections joined in a permanent or semi-permanent way. In short, the transaction item may be any suitable device to receive processing by a processing system 100.

Processing of the transaction item 8 by the first and second item altering devices 4 and 6 (or other altering devices in the system 100), may cause the item 8 to be uniquely identified from other transaction items in a set of transaction items properly processed by the system 100. For example, the "123" identifier may be unique to the transaction item 8 such that no other transaction item processed by the system 100 includes the same "123" identifier. Having transaction items with unique characteristics can be very useful in certain situations, such as frequent shopper loyalty or frequent flier programs, so that individual persons issued a transaction item can be uniquely identified from other persons issued similar transaction items, e.g., based on the "123" identifier.

Figure 3:
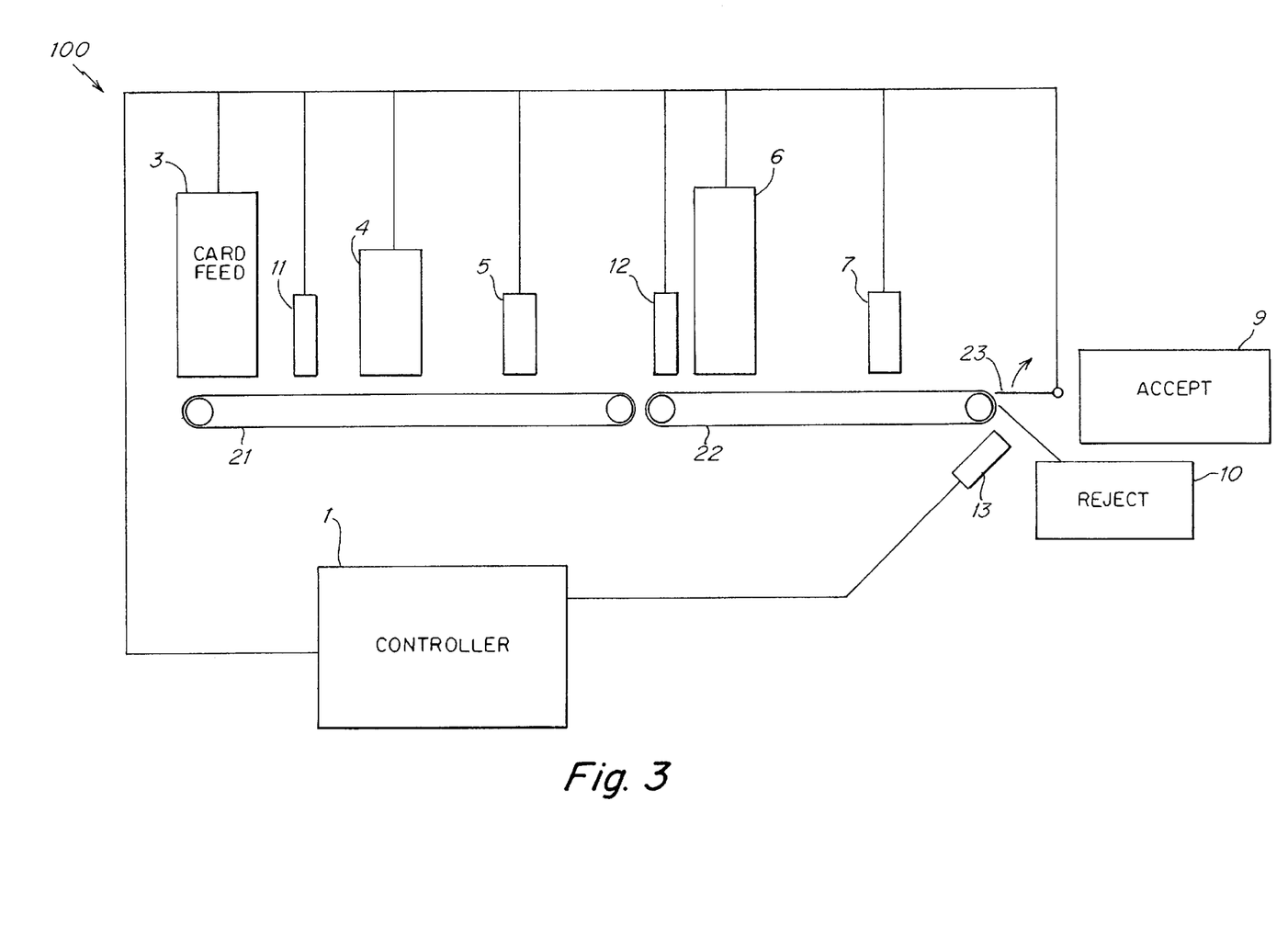
FIG. 3 is a schematic diagram of a second processing system in accordance with an aspect of the invention.

FIG. 3 shows another schematic diagram of a transaction item processing system 100 in accordance with an aspect of the invention. This illustrative embodiment is similar to that in FIG. 1. One difference from the FIG. 1 embodiment is that the transport has two transport sub-systems 21 and 22. The sub-systems may be separate conveyor belts 21 and 22 that carry transaction items at different speeds. For example, the conveyor belt 21 may run at a relatively high speed if the item altering device 4 (e.g., an encoder) is capable of processing the transaction items very rapidly, e.g., at speeds between 20 and 1,100 feet per minute. In contrast, the second conveyor belt 22 may run at a different speed if the second item altering device 6 (e.g., a printer) does not process transaction items at the same rate as the first item altering device 4. For example, inkjet printers are capable of printing a transaction item at very high speeds which may be equal to or greater than that of some high speed magnetic strip encoders, but thermal printers typically require that the transaction item travel at a much slower speed. Thus, the conveyor belt 22 may run at a slower speed to accommodate a thermal printer or other slower operating image forming device. The combination of the two speed conveyor or other transport systems can speed overall transaction item production rates because some transaction item processing can be performed at a relatively faster speed, whereas other processing may be performed at a slower, though maximum speeds for that processing. It will be understood that various processing segments may be performed at a maximum possible speed to reduce item processing times and increase item output. In one embodiment, at least one of the conveyor belts 21 or 22 may move items at a speed of 20 feet per minute and up. In this embodiment, items may be produced at a rate of approximately 200 to 2,000 items per hour and up. Of course, shorter processing path lengths, faster processing, etc. can increase item production rates. The type of processing performed on the transaction items may also affect transaction item production rates since some process may be inherently slower than others.

Although in this embodiment, the transport 2 has two components, e.g., conveyor belts 21 and 22, the transport 2 may be segmented into three or more sections. For example, verification by the sensors 5 and 7 may be performed at a more rapid pace than either the encoding or printing processes. As a result, a first item transport may be used for encoding, a second transport may be used for verification sensing at the sensor 5, a third transport may be used for printing, and a fourth transport may be used for verification at the sensor 7. It should be understood that this is only one example of how the transport 2 may be broken down into sub-transport systems, and that the transport 2 may include any suitable number and/or arrangement of transport sub-systems, e.g., to provide minimum time between and during item processing operations.

Another difference from the FIG. 1 embodiment includes item position sensors 11 and 12 preceding the first and second item altering devices 4 and 6. These sensors 11 and 12 can be used by the controller 1 to determine a position of a transaction item relative to an item altering device and/or a verification sensor so that processing, such as encoding, printing and/or verification, of the transaction item can be properly synchronized. For example, a transaction item detection signal output by one of the sensors 11 or 12 may be used to determine the position of the item on a belt and a start timing for processing by an encoder or printer so that encoding or printing occurs at an appropriate time or place on the transaction item. An item sensor 13 can be used to determine when an item has entered a reject bin 10, described in more detail below. Of course, it will be understood that other transaction item sensors may be included in any suitable arrangement in the system 100. For example, sensors may be included in the transport 2 to determine transaction item position.

Another difference with the FIG. 1 embodiment is a diverter gate 23 that directs transaction items either to an accept bin 9 or a reject bin 10. That is, if the verification system (e.g., sensors 5 and 7 operating with the controller 1) determines that a transaction item has not been properly processed, the diverter gate 23 may rotate upward to direct the transaction item to the reject bin 10, and the controller 1 may control the system 100 to remake the improperly processed transaction item. Alternately, if the transaction item is properly processed, the diverter gate 23 may allow the item to pass to an accept bin 9. Although the accept bin 9 is shown schematically as a simple collection box in this example, the accept bin 9 may include any suitable components, such as a collection conveyor that runs with a speed change to separate batches of transaction items produced by the system 100, a separate, backup verification system to ensure that transaction items have in fact been properly processed, transaction item stacking and gathering equipment, e.g., to position the items in stacks or other groups to preserve their sequential order, or any other post-processing system.

As with the FIG. 1 embodiment, the system 100 may be arranged in any suitable way, e.g., to change the order of processing, how transaction items are fed to the transport 2, and so on.

Figure 4:
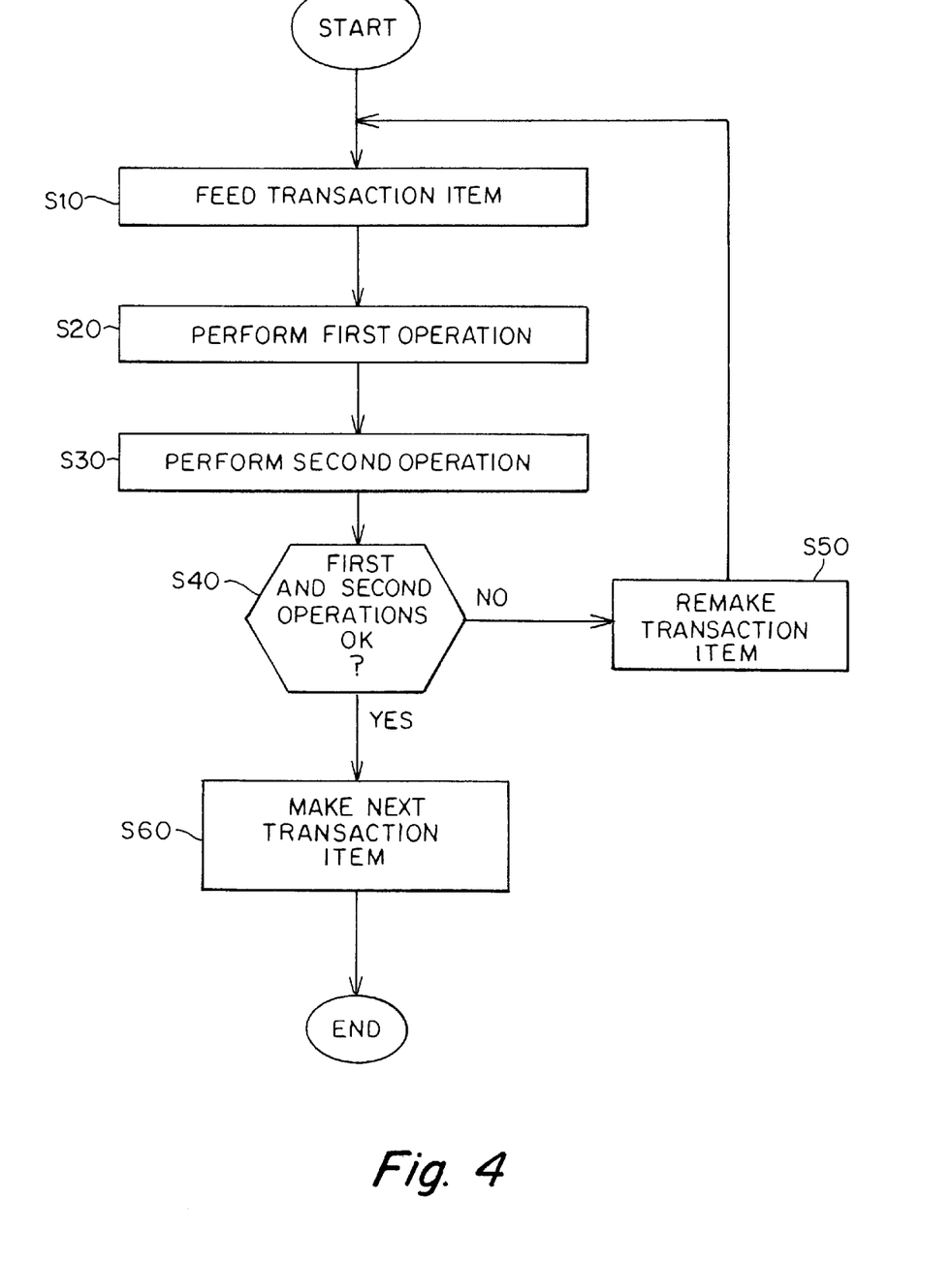
FIG. 4 is a flowchart of steps in a method for processing transaction items.

FIG. 4 shows a flow chart of steps for processing transaction items in accordance with an aspect of the invention. In step S10, a transaction item is fed. For example, a transaction item that includes a transaction card portion having an encodable magnetic strip and at least one surface on which information may be printed can be fed onto a transport system, such as a conveyor belt. The transport system may include indexing devices or other elements that determine the position of the transaction item on the transport and/or ensure the transaction item remains in place on the transport.

In step S20, the transaction item is processed in a first operation. The first operation may include one or more individual process steps performed by one or more devices, and causes the transaction item to be changed in some way. For example, a magnetic strip on the transaction item may be encoded by one or more encoders or an image, or portion of an image, may be printed on the item by one or more printers. Thus, the first operation may include any suitable process, such as encoding an alphanumerical sequence or other information into a magnetic strip, electronic device, optical storage or other memory in the transaction item, printing, etching, or otherwise marking information on the item, and so on.

In step S30, the transaction item is processed in a second operation. This second operation likewise may include one or more process steps performed by one or more devices, and causes the transaction item to be changed in some way. For example, the second operation can include forming any suitable image information on the transaction item, such as printing a bar code, alphanumeric sequence, image, photograph, and so on. The first and/or second operations may cause the item, when the operations are performed properly, to be uniquely identified from other processed transaction items in a set. For example, the first and/or second operations may form a unique feature, such as an encoded identifier or image information, that is unlike any other feature carried by other transaction items in a set. The unique feature may be created by a single process performed by a single device, such as a number sequence printed on an item by a printer, or by multiple processes performed by multiple devices, such as a number sequence printed on an item by two or more printers where each printer prints only a portion of the number sequence.

In step S40, verification of the first and second operations is performed. For example, a determination may be made whether encoding and printing of the transaction item was properly performed. Encoded information may be read back from a magnetic strip or other memory on the transaction item, and image capture/analysis may be performed to determine if the image information printed on the transaction item appears correct. If the first and second operations, such as encoding and/or printing processes, were not performed properly, an instruction to remake the transaction item may be made in step S50, and flow jumps back to step S10 to remake the improperly processed transaction item. Otherwise, in step S60, a next transaction item is made. A transaction item may be remade by re-processing the same transaction item that was improperly processed, e.g., by re-encoding a magnetic strip, or by discarding the improperly processed substrate and processing a new transaction item. For example, a processing system may be provided with multiple, unprocessed transaction items, such as transaction cards that have not been encoded or printed in any way. If a transaction item is improperly processed, the improperly processed item may be discarded and a new, unprocessed transaction item provided and subjected to processing. If the new transaction item is properly processed, the transaction item will include the unique feature or other characteristics intended for the previously discarded item.

It should be understood that steps in the above process may be reordered in any suitable way, except that verification processes can typically only be performed after the relevant processing of the item is complete. That is, verification of encoding can only be performed after encoding, or at least some portion of encoding, is complete on the item. In addition, the process may be altered to include only one operation, such as encoding only or marking only, performed on the transaction item.

Although particular embodiments have been described in detail, various modifications and improvements will readily occur to those skilled in the art. Such modifications and improvements are intended to be part of this disclosure and within the spirit and scope of the invention. Accordingly, the description of the illustrative embodiments is by way of example only, and the invention is defined, at least in part, by the following claims and their equivalents.

What is claimed is:

1. A system for processing transaction items to create a set of transaction items where each transaction item in the set is uniquely identified from other transaction items in the set, the system comprising:

a transport that moves transaction items along a path;

a first item altering device that performs an operation on a first transaction item;

a second item altering device that performs an operation on the first transaction item, at least one of the operations performed by the first and second item altering devices, when properly performed, causing the first transaction item to be uniquely identified from other transaction items in a set of transaction items properly processed by the first and second item altering device;

a verification system that detects information indicative of whether the transaction item has been properly processed by the first and second item altering devices; and a controller that automatically controls the first and second item altering devices to remake the first transaction item if the first transaction item has been improperly processed by at least one of the first and second item altering devices before controlling the first and second item altering devices to process a next transaction item.

2. The system of claim 1, wherein the transport, first and second item altering devices and verification system are constructed and arranged to process at least 500 items per hour.

3. The system of claim 1, wherein transaction items travel along the path at an average speed of at least 10 feet per minute.

4. The system of claim 1, wherein transaction items move along the path at two or more distinct speeds.

5. The system of claim 1, wherein the transport includes two transport subsystems that move transaction items along the path at different speeds.

6. The system of claim 1, wherein the controller controls the system to process the set of transaction items so that completed, properly processed transaction items are made in a specific sequence irrespective of whether any individual transaction items are improperly processed.

7. The system of claim 1, wherein the first item altering device includes an encoder constructed and arranged to encode a memory in transaction items at a speed of 2000 items per hour or more.

8. The system of claim 1, wherein the first item altering device includes a high speed magnetic strip encoder.

9. The system of claim 1, wherein the second item altering device includes a thermal printer.

10. The system of claim 1, wherein the first item altering device includes at least one high speed inkjet printer.

11. The system of claim 10, wherein the first item altering device includes a high speed magnetic strip encoder.

12. The system of claim 11, wherein the high speed magnetic strip encoder encodes a unique identifier in memories of transaction items, the unique identifier allowing the transaction items in the set to be uniquely identified from each other.

13. The system of claim 11, wherein the at least one high speed inkjet printer prints a unique identifier on transaction items, the unique identifier allowing the transaction items in the set to be uniquely identified from each other.

14. A method for processing a set of processed transaction items, comprising:

moving a first transaction item along a path;

performing a first operation on the first transaction item that alters the first transaction item;

performing a second operation on the first transaction item that alters the first transaction item, the first and second operations, when properly performed, causing the first transaction item to be uniquely identified from other transaction items in a set of processed transaction items;

detecting information indicative of whether the first and second operations were properly performed on the first transaction item; and automatically remaking the first transaction item if one of the first and second operations were improperly performed on the first transaction item before making a next transaction item so that the set of processed transaction items is created in a specific transaction item sequence.

15. The method of claim 14, wherein the step of moving a first transaction item comprises moving the first transaction item at a rate of at least 20 feet per minute at some point along the path.

16. The method of claim 14, wherein the step of moving a first transaction item comprises moving the first transaction item along the path at an average speed of at least 10 feet per minute.

17. The method of claim 14, wherein the step of moving a first transaction item comprises moving the first transaction item along the path at at least two distinct speeds.

18. The method of claim 14, wherein the step of moving a first transaction item comprises moving the first transaction item via two transport subsystems that move transaction items along the path at different speeds.

19. The method of claim 14, wherein transaction items are processed so that completed, properly processed transaction items are made in a specific sequence irrespective of whether any transaction items are improperly processed.

20. The method of claim 14, wherein the step of performing the first operation on the first transaction item comprises encoding a memory in the first transaction item at a speed of 2000 items per hour or more.

21. The method of claim 14, wherein the step of performing the first operation on the first transaction item comprises encoding a memory in the first transaction item with a high speed magnetic strip encoder.

22. The method of claim 14, wherein the step of performing the first operation on the first transaction item comprises printing on the transaction item with a thermal printer.

23. The method of claim 14, wherein the step of performing the first operation on the first transaction item comprises printing on the transaction item with a high speed inkjet printer.

24. The system of claim 23, wherein the step of performing the second operation on the first transaction item comprises encoding a memory in the first transaction item with a high speed magnetic strip encoder.

25. The system of claim 14, wherein at least one of the first and second operations forms variable information on the first transaction item that is unique compared to variable information formed on other transaction items in the set of transaction items.

26. A transaction item processing system comprising:

a transport that moves transaction items along a path;

at least one encoder that encodes a memory in a transaction item;

at least one printer that forms an image on a transaction item;

a verification system that detects information indicative of whether the memory in a transaction item is encoded properly and whether an image on the transaction item is formed properly; and a controller that automatically controls the encoder and printer to remake a transaction item if the memory is improperly encoded or the image is improperly formed before controlling the encoder and printer to make a next transaction item.

27. The system of claim 26, wherein the controller controls the at least one encoder and the at least one printer to encode and print a plurality of transaction items in a set, and at least one of information encoded in the memory of each transaction item and the image printed on each transaction item in the set uniquely identifies the transaction item from other transaction items in the set.

28. The system of claim 26, wherein the controller controls the at least one encoder and the at least one printer to encode and print a plurality of transaction items in a set, at least one of information encoded in the memory of each processed transaction item and the image printed on each processed transaction item in the set uniquely identifies the transaction item from other processed transaction items in the set, and the transaction items in the set are produced in a specific sequence regardless of whether any individual transaction items are processed improperly by one of the at least one encoder and printer.

29. The system of claim 26, wherein the transport, encoder, printer and verification system are constructed and arranged to process at least 500 items per hour.

30. The system of claim 26, wherein transaction items travel along the path at an average speed of at least 10 feet per minute.

31. The system of claim 26, wherein transaction items move along the path at at least two distinct speeds.

32. The system of claim 26, wherein the transport includes two transport subsystems that move transaction items along the path at different speeds.

33. The system of claim 26, wherein the controller controls the system to process transaction items so that completed, properly processed transaction items are made in a specific sequence irrespective of whether any individual transaction items are improperly processed.

34. The system of claim 26, wherein the at least one encoder is constructed and arranged to encode transaction items at a speed of 2000 items per hour or more.

35. The system of claim 26, wherein the at least one encoder includes a high speed magnetic strip encoder.

36. The system of claim 26, wherein the at least one printer includes a thermal printer.

37. The system of claim 26, wherein the at least one printer includes a high speed inkjet printer.

38. The system of claim 37, wherein the at least one encoder includes a high speed magnetic strip encoder.

39. A method for processing transaction items, comprising:

moving a first transaction item along a path;

encoding a memory in the first transaction item;

forming an image on the first transaction item;

detecting information indicative of whether the memory in the first transaction item is encoded properly;

detecting information indicative of whether an image on the first transaction item is formed properly; and automatically remaking the first transaction item if the memory is improperly encoded or the image is improperly formed before encoding or printing a next transaction item.

40. The method of claim 39, wherein the step of moving a first transaction item comprises moving the first transaction item at a rate of at least 10 feet per minute at some point along the path.

41. The method of claim 39, wherein the step of moving a first transaction item comprises moving the first transaction item along the path at an average speed of at least 200 items per hour.

42. The method of claim 39, wherein the step of moving a first transaction item comprises moving the first transaction item along the path at at least two distinct speeds.

43. The method of claim 39, wherein the step of moving a first transaction item comprises moving the first transaction item via two transport subsystems that move transaction items along the path at different speeds.

44. The method of claim 39, further comprising:

encoding memories in a plurality of transaction items in a set;

forming images on a plurality of transaction items in the set, at least one of information encoded in the memory of each transaction item and image information on each transaction item uniquely identifies each transaction item from other transaction items in the set; and processing transaction items so that completed, properly processed transaction items in the set are made in a specific sequence irrespective of whether any transaction items are improperly processed.

45. The method of claim 39, wherein the step of encoding the first transaction item comprises encoding at a speed of 2000 items per hour or more.

46. The method of claim 39, wherein the step of encoding the first transaction item comprises encoding with a high speed magnetic strip encoder.

47. The method of claim 39, wherein the step of printing the first transaction item comprises printing with a high speed inkjet printer.

48. The method of claim 39, wherein the step of printing the first transaction item comprises printing with a thermal printer.

49. The system of claim 48, wherein the step of encoding the first transaction item comprises encoding with a high speed magnetic strip encoder.

50. A transaction item processing system for processing a set of transaction items, the system comprising:

a transport that moves transaction items along a path, the transaction items moving at a speed of at least 10 feet per minute at some point along the path;

an encoder that encodes a memory in transaction items that move along the path;

a printer that forms an image on transaction items that move along the path, at least one of information encoded in the memory and the image on each transaction item uniquely identifying the transaction item from all other transaction items in the set;

a verification system that detects information indicative of whether the memory in a transaction item is encoded properly and whether an image on the transaction item is formed properly; and a controller that determines whether a memory in a transaction item is properly encoded and whether an image on the transaction item is properly formed before controlling the encoder and printer to process a next transaction item in the set, and controls the encoder and printer to remake a transaction item if the memory is improperly encoded or the image is improperly formed.

51. The system of claim 50, wherein the transport, encoder, printer and verification system are constructed and arranged to process at least 200 items per hour.

52. The system of claim 50, wherein transaction items travel along the path at an average speed of at least 10 feet per minute.

53. The system of claim 50, wherein transaction items move along the path at at least two distinct speeds.

54. The system of claim 50, wherein the transport includes two transport subsystems that move transaction items along the path at different speeds.

55. The system of claim 50, wherein the controller controls the system to process transaction items so that completed, properly processed transaction items in the set are made in a specific sequence irrespective of whether any individual transaction items are improperly processed.

56. The system of claim 50, wherein the encoder is constructed and arranged to encode transaction items at a speed of 2000 items per hour or more.

57. The system of claim 50, wherein the encoder includes at least one high speed magnetic strip encoder.

58. The system of claim 50, wherein the printer includes at least one high speed inkjet printer.

59. The system of claim 50, wherein the printer includes at least one thermal printer.

60. A system for processing transaction items, comprising:

means for moving a first transaction item along a path;

means for encoding a memory in the first transaction item;

means for forming an image on the first transaction item;

means for detecting information indicative of whether the memory in the first transaction item is encoded properly;

means for detecting information indicative of whether an image on the first transaction item is formed properly; and means for automatically controlling the means for encoding and the means for forming to remake the first transaction item if the memory is improperly encoded or the image is improperly formed before making a next transaction item.

61. A method for processing a set of processed transaction items, comprising:

moving a first transaction item along a path;

performing a first operation on the first transaction item that alters the first transaction item, the first operation, when properly performed, forming image information on the first transaction item and causing the first transaction item to be uniquely identified from other transaction items in a set of processed transaction items;

detecting information indicative of whether the first operation was properly performed on the first transaction item; and automatically remaking the first transaction item if the first operation was improperly performed on the first transaction item before making a next transaction item so that the set of processed transaction items is created in a specific transaction item sequence.

62. The method of claim 61, wherein the step of performing the first operation includes thermal printing information on the transaction item.

63. A method for processing a set of processed transaction items, comprising:

moving a first transaction item along a path;

performing a first operation on the first transaction item that alters the first transaction item, the first operation, when properly performed, causing the first transaction item to be uniquely identified from other transaction items in a set of processed transaction items;

detecting information indicative of whether the first operation was properly performed on the first transaction item;

automatically remaking the first transaction item if the first operation was improperly performed on the first transaction item before making a next transaction item so that the set of processed transaction items is created in a specific transaction item sequence; and repeating the steps of performing a first operation and detecting information to process a plurality of transaction items in the set of processed transaction items at a rate of at least 2000 transaction items per hour.

* * * * *